US010581797B2

(12) United States Patent
Ripke et al.

(10) Patent No.: US 10,581,797 B2
(45) Date of Patent: Mar. 3, 2020

(54) HYBRID ACCESS DNS OPTIMIZATION FOR MULTI-SOURCE DOWNLOAD

(71) Applicant: NEC EUROPE LTD., Heidelberg (DE)

(72) Inventors: Andreas Ripke, Neckargemuend (DE); Simon Oechsner, The Hague (NL); Mischa Schmidt, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 226 days.

(21) Appl. No.: 15/549,387

(22) PCT Filed: Mar. 31, 2015

(86) PCT No.: PCT/EP2015/057042
§ 371 (c)(1),
(2) Date: Aug. 8, 2017

(87) PCT Pub. No.: WO2016/155796
PCT Pub. Date: Oct. 6, 2016

(65) Prior Publication Data
US 2018/0026935 A1    Jan. 25, 2018

(51) Int. Cl.
*G06F 13/00* (2006.01)
*H04L 29/12* (2006.01)
*H04L 29/08* (2006.01)

(52) U.S. Cl.
CPC .......... *H04L 61/1511* (2013.01); *H04L 61/10* (2013.01); *H04L 61/2007* (2013.01);
(Continued)

(58) Field of Classification Search
CPC ............. H04L 61/1511; H04L 67/2842; H04L 61/2007; H04L 61/6009; H04L 61/10; H04L 61/6077
(Continued)

(56) References Cited

U.S. PATENT DOCUMENTS

| | | | |
|---|---|---|---|
| 6,425,003 B1 * | 7/2002 | Herzog | G06F 9/44589 709/203 |
| 7,177,947 B1 * | 2/2007 | Herzog | H04L 29/12066 707/999.007 |

(Continued)

OTHER PUBLICATIONS

Savolainen Nokia J Kato T Lemon Nominum T et al: "Improved Recursive DNS Server Selection for Multi-Interfaced Nodes; rfc6731. txt", Improved Recursive DNS Server Selection for Multi-Interfaced Nodes; rfc6731.txt, Internet Engineering Task Force, IETF; Standard, Internet Society (ISOC) 4, Rue Des Falaises CH—1205 Geneva, Switzerland, Dec. 19, 2012 (Dec. 19, 2012), pp. 1-29, XP015086513.

*Primary Examiner* — Kenneth R Coulter
(74) *Attorney, Agent, or Firm* — Leydig, Voit & Mayer, Ltd.

(57) ABSTRACT

A method for operating a home gateway that implements hybrid access with a number of interfaces to different access networks includes resolving, by a domain name service (DNS) proxy function of the home gateway, DNS resolution requests received from a client of the home gateway; and returning, by the DNS proxy function, corresponding DNS resolution responses to the client. The DNS proxy function, based on a single DNS resolution request from the client, requests a number of DNS resolutions via different interfaces of the home gateway transparently to the client.

18 Claims, 1 Drawing Sheet

(52) U.S. Cl.
CPC ...... *H04L 61/6009* (2013.01); *H04L 67/2842*
(2013.01); *H04L 61/6077* (2013.01)

(58) Field of Classification Search
USPC .................................................. 709/245, 203
See application file for complete search history.

(56) References Cited

U.S. PATENT DOCUMENTS

| | | | | |
|---|---|---|---|---|
| 8,200,696 | B2* | 6/2012 | Keohane | G06F 16/957 |
| | | | | 707/781 |
| 8,515,995 | B2* | 8/2013 | Keohane | G06F 16/957 |
| | | | | 707/781 |
| 8,750,863 | B2* | 6/2014 | Shah | H04W 48/17 |
| | | | | 455/432.1 |
| 9,402,175 | B2* | 7/2016 | Shah | H04W 48/17 |
| 2010/0211628 | A1* | 8/2010 | Shah | H04W 48/17 |
| | | | | 709/203 |
| 2012/0185609 | A1* | 7/2012 | Keohane | G06F 16/957 |
| | | | | 709/245 |
| 2013/0007860 | A1* | 1/2013 | Burckart | H04N 21/222 |
| | | | | 726/7 |
| 2014/0242980 | A1* | 8/2014 | Shah | H04W 48/17 |
| | | | | 455/432.1 |

* cited by examiner

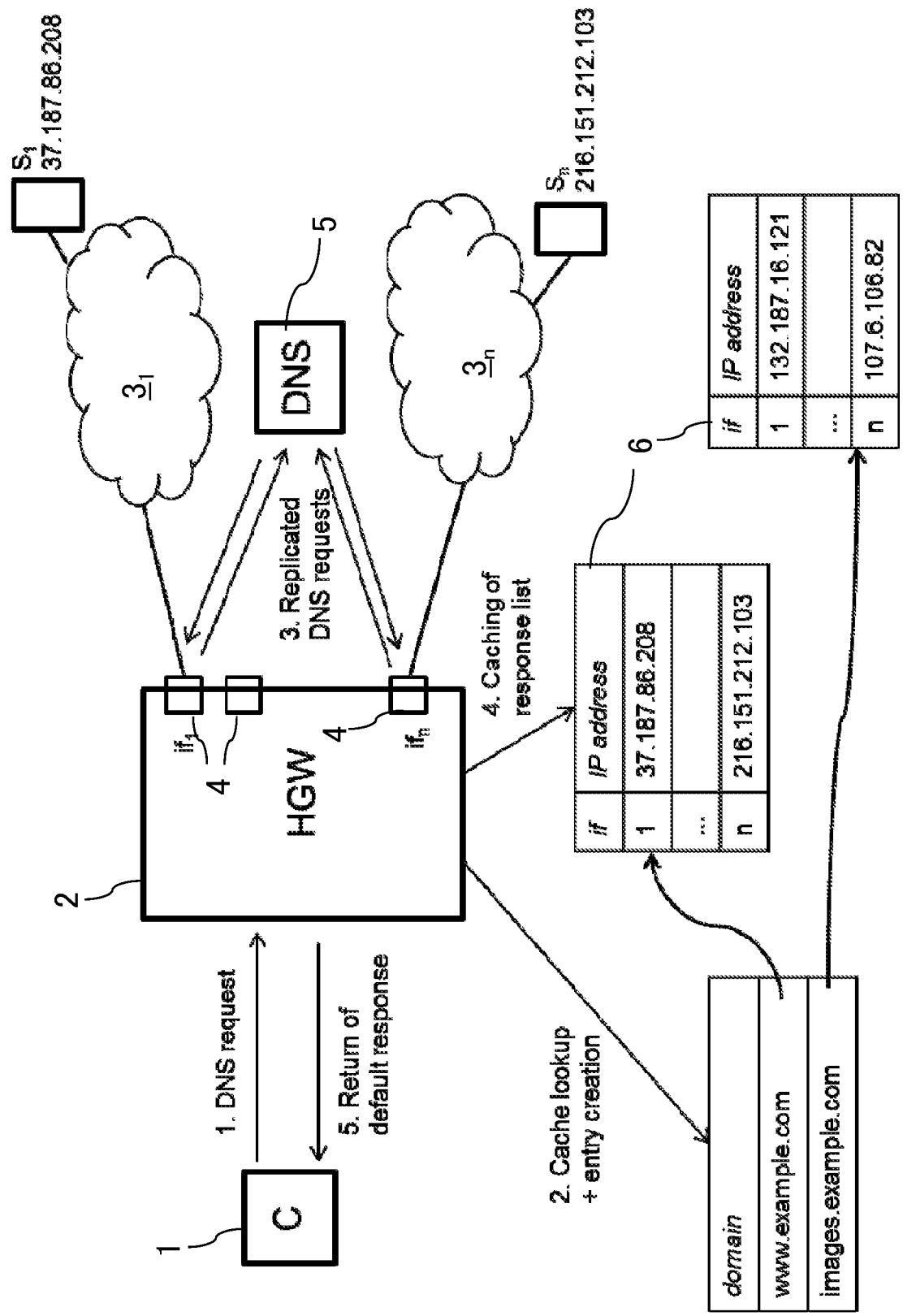

HYBRID ACCESS DNS OPTIMIZATION FOR MULTI-SOURCE DOWNLOAD

CROSS REFERENCE TO RELATED APPLICATIONS

This application is a U.S. National Stage Application under 35 U.S.C. § 371 of International Application No. PCT/EP2015/057042 filed on Mar. 31, 2015. The International Application was published in English on Oct. 6, 2016 as WO 2016/155796 A1 under PCT Article 21(2).

FIELD

The present invention relates to a method for operating a home gateway that implements hybrid access with a number of interfaces to different access networks Furthermore, the present invention relates to a device for deployment as a home gateway.

BACKGROUND

Home Gateways (HGW) that implement Hybrid Access (HyA) offer clients access to the internet over different access networks, e.g., over a network using DSL and over another network using LTE. In such cases the gateways may be connected to these networks by different interfaces, but they may hide this from the clients.

Being attached to multiple different networks with different configurations causes issues such as discussed by the IETF's working group on Multiple Interfaces (IETF WG MIF), for reference see http://datatracker.ietf.org/wg/mif/charter/. These issues, however, are mainly related to the configuration of the host with multiple interfaces, i.e., the HGW in the above example, due to potentially conflicting configuration information (DHCP, default routes, DNS servers, etc.) received over the different interfaces.

A different, somewhat independent problem occurs in the situation where it is assumed that the DNS servers to be used, i.e. either the same DNS server for all interfaces or a different one per interface, are configured correctly. These DNS servers might resolve a query to different resource records, i.e. different IP addresses, depending on the interface from which the query originated. An example would be the DNS component of a CDN network, which should return content servers that have an advantageous location in relation to the query origin. However, current practices, as described, e.g., in Wasserman, M., Seite, P, RFC 6419: "Current Practices for Multiple-Interface Hosts" (http://datatracker.ietf.org/doc/rfc6419/), typically just query using the default interface, or select and use just one DNS response in case a domain name needs to be resolved. In any case, if the HGW should act as a transparent proxy to clients, only one response should be forwarded to the client in any case.

On the other hand, one of the advantages of being attached to multiple networks is that the capacity of these access connections could be combined (to 'boost' the capacity seen by clients). To this end, content should be downloaded over more than one interface at the same time. One method to achieve this is Multipath TCP (MPTCP), but currently there are not many servers implementing and supporting MPTCP. An alternative is downloading content using several (normal) TCP connections, implementing the multipath download on application layer, using e.g. HTTP range requests (for parallel downloads from a single source and from several identical sources, respectively), such as described in K. Evensen et al.: "Using bandwidth aggregation to improve the performance of quality-adaptive streaming", in Signal Processing: Image Communication, 27(4): 312{328, April 2012, or in Pablo Rodriguez and Ernst W. Biersack: "Dynamic parallel access to replicated content in the internet", in IEEE/ACM Trans. Netw., 10(4):455 {465, August 2002.

SUMMARY

In an embodiment, the present invention provides a method for operating a home gateway that implements hybrid access with a number of interfaces to different access networks. The method includes resolving, by a domain name service (DNS) proxy function of the home gateway, DNS resolution requests received from a client of the home gateway; and returning, by the DNS proxy function, corresponding DNS resolution responses to the client. The DNS proxy function, based on a single DNS resolution request from the client, requests a number of DNS resolutions via different interfaces of the home gateway transparently to the client.

BRIEF DESCRIPTION OF THE DRAWINGS

The present invention will be described in even greater detail below based on the exemplary FIGURES. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

The FIGURE is a schematic view illustrating a hybrid access the DNS optimization scenario for multi-source download in accordance with an embodiment of the present invention.

DETAILED DESCRIPTION

The present invention relates to a method for operating a home gateway that implements hybrid access with a number of interfaces to different access networks, wherein said home gateway comprises a DNS proxy function that resolves DNS resolution requests received from a client of said home gateway and returns corresponding DNS resolution responses to said client.

Furthermore, the present invention relates to a device for deployment as a home gateway, comprising a number of interfaces to different access networks for providing said home gateway with hybrid access capabilities, and a DNS proxy function that is configured to resolve DNS resolution requests received from a client of said home gateway and to return corresponding responses to said client.

A main problem addressed by the present invention is that if only one server is selected for the download (as a consequence of selecting just one DNS response), then this server might be well located with respect to one of the access networks (i.e. in terms of, e.g., low latency, high throughput, well traffic-engineered routes, or the like), but not with respect to one the other ones. If all interfaces establish connections to this single server, all but one of these connections might be suboptimal, both from the perspective of the user (in particular in terms of lower overall throughput) and the network providers (in particular in terms of inefficient/costly traffic routes). In the particular case of a CDN network, it is to be assumed that servers at a better network location exist for these other connections.

If download connections are opened to a large set of identical servers without taking into account their position to the HGW interfaces, basically the same problem occurs. Actually, none of the servers might be well placed with respect to a HGW interface.

Embodiments of the present invention provide a method for operating a home gateway that implements hybrid access and a device for deployment as a home gateway in such a way that the potential of the hybrid access capabilities is utilized efficiently.

According to an embodiment, a method is provided that is characterized in that said DNS proxy function, based on a single DNS resolution request from said client, requests a number of DNS resolutions via different interfaces of said home gateway transparently to said client.

According to an embodiment, a system is provided that is characterized in that said DNS proxy function is further configured to request, based on a single DNS resolution request from said client, a number of DNS resolutions via different interfaces transparently to said client.

DNS resolution as applied in prior art hybrid access gateways in many cases yields suboptimal connections, in particular in terms of efficiency, throughput and costs. As a solution, embodiments of the present invention provide a methods and devices to transparently request a number of DNS resolutions of multiple interfaces based on a single DNS resolution request from a client. Embodiments of the present invention can enable clients or, to be more specific, applications implemented on clients, to transparently use a number of content servers (selected by DNS to be appropriate for each individual access network) concurrently, instead of using a single content server, which might be suboptimally located for some interfaces.

Embodiments of the present invention can be particularly advantageous and provide highest benefits in application scenarios where different content servers exist with the same content and in suitable locations with respect to individual interfaces of the home gateway. However, if this is not the case, the download performance should not be decreased in comparison to the current state-of-the-art. In any case, it provides an easy fallback to the standard behavior, i.e., single DNS response.

According to a preferred embodiment the DNS proxy function, upon receiving a DNS resolution request from a client, may generate a number of new DNS resolution requests, preferably one request per interface, using the IP address of an interface as the source IP address for the respective request. In this context it may be provided that the home gateway compares DNS resolution requests it receives from the client to a local cache of requests. In case there is no entry for a domain name of a DNS resolution request, the home gateway may create a new entry mapping the respective domain name to a map that contains the interfaces of the home gateway together with associated entries for the resolved IP addresses of said domain names, e.g. a map in the form of <interface, IP address>.

According to a preferred embodiment it may be provided that the home gateway generates enriched DNS information, preferably including a response list that contains all addresses received as DNS resolution responses for their corresponding interfaces.

According to an embodiment it may be provided that the enriched DNS information is exchanged between the DNS proxy and an application proxy located on the home gateway, preferably via a proprietary interface. That is, the application using the enriched DNS information can be located on the HGW itself, i.e., in the form of an application layer proxy such as an HTTP proxy. In this case, the enriched DNS information can be exchanged between the DNS proxy and the application using a proprietary interface. The application proxy then could map (single-source) content requests from an application on the client to multi-source download requests, transparently to the client. For this, it may be provided that the application proxy intercepts client requests and looks up the (multi-interface) entries of the DNS proxy that match the request. This would be possible, for example, in the case of plain HTTP.

According to another preferred embodiment the DNS proxy may provide its enriched information directly to (multi-source capable) applications implemented on the client. This may be realized by means of an interface for returning cached IP endpoints with interface distinctions from the DNS proxy to the respective application (suitable for multi-source download) on said client. This has the advantage of flexibility and of being application-layer protocol-independent, e.g., also supporting HTTPS. For this option, it may be provided that a DNS response is sent to a client application that includes a selection of resolved IP addresses for different interfaces, so that the application can then establish connections to this set of endpoints or to a subset thereof. As the routes for packets to these endpoints are already set in the HGW, this automatically leads to a better utilization of the HGW interfaces.

With respect to the delivery of this response to an application implemented on the client, an extended interface may be provided, for which several implementation possibilities may be envisioned. For instance, the extended interface would take its most general and standardized form as an extension to the DNS protocol. Specifically, new resource records (RR) replacing the existing A and AAAA resource record formats in the answer message type for multi-source responses may be established. Instead of containing a list of IP addresses per domain name in an A (or AAAA) resource record, the extension may be designed to clearly separate lists of IP addresses according to the interfaces on which these responses were received. It is not strictly necessary to disclose the actual interface descriptions to a client application, just that different IP addresses do not belong to the same interface and provide alternative routes. For non-multi-source capable applications that do consequently not support this extension, the DNS proxy may be configured to only return to the client a standard response corresponding to the default interface of the HGW. Thus, the DNS resolution is transparent to the client application in this case and looks similar to the default, non-Hybrid-Access case.

To avoid standardizing a new RR type, a workaround would be to use the existing TXT RR type to convey the interface-IP address(es) mapping. A proper format and list of attributes would need to be defined so that multi-source capable client applications can extract the information in a standardized way from such a RR.

According to still another alternative to a full DNS extension, it may be provided to craft from a received set of responses a single DNS response at the DNS proxy that follows the standard DNS message format. However, according to an embodiment of the invention this message has as its content one IP address per interface, i.e., of each of the responses received over a given interface one of the results is chosen to be included in the final response delivered to the client application by the DNS proxy. The first entry would be an IP address received over the preferred interface. Clients unaware of Hybrid access or incapable of exploiting it would then not note a difference to standard DNS, since normal default behavior is to choose the first entry of the list for a single connection. On the other hand, multi-source download-capable client applications could establish a connection to each of the returned addresses and thus utilize each of the interfaces.

A better regulated and clearer separation of the single-source case from the multi-source case could be achieved by using the OPT pseudo-RR of EDNS, as defined in RFC 6801. Here, a multi-source capable client could communicate its capability and request for a list of IP addresses for separate connections by using an OPT RR with a (to be defined) OPTION-CODE in the additional data section of its request. The proxy would then only return an answer as described in the last two items above if it finds this option; otherwise it returns a normal DNS response with just the IP address returned for the default interface.

Regardless of the implementation of how to deliver the enriched DNS information to the client, a multi-source capable application on the client would then establish a number of connections (in contrast to a single-source download/standard application) to IP addresses corresponding to different HGW interfaces. Due to the set routes there, these connections take different routes through the network, utilizing all or a number of access networks instead of just one. Scheduling of content requests for the different connections, bandwidth optimization etc. would be handled by the client application, allowing for different implementations.

According to preferred embodiment it may be provided to use the DNS resource records gathered via the different interfaces, i.e. the received DNS resolution responses and their corresponding interfaces, directly for routing purposes/configurations on the HGW. A possible way of realizing this is to configure the routing/forwarding table on the HGW by selecting as outgoing port for each IP address in a received resource record the interface over which that resource record was received. Thus, a rule is installed, e.g., via iptables, to forward packets with destination IP address a.b.c.d to interface $if_x$ if a.b.c.d was contained in a DNS response received over $if_x$. This allows for multi-source download application content requests to be routed over the appropriate interfaces of a multi-interface home gateway, leading to a better bandwidth utilization.

The FIGURE schematically illustrates an application scenario of a method of operating a home gateway that implements hybrid access in accordance with an embodiment of the present invention. According to the illustrated scenario, a client C, generally denoted by reference numeral 1, is connected to the public Internet via a Home Gateway (HGW) 2 that implements Hybrid Access, with interfaces 4 ($if_1, \ldots, if_n$) to n different access networks $3_1, \ldots, 3_n$.

As shown in step 1, the client 1 sends a single DNS resolution request for a domain name to its default DNS server 5. A DNS proxy (not shown) implemented on the HGW 2 receives this DNS resolution request and compares it to a local cache of requests (as shown in step 2.). If there are no entries for this domain name, it creates a new entry mapping the domain name (e.g. "www.example.com") to a map 6 of <interface, IP address>. As shown in step 3, the DNS proxy then generates n new DNS resolution requests, one per interface 4/access network 3, using the respective interface IP as the source IP. It should be noted that this implementation is in strong contrast to prior art solutions, since the current practice is to just select one interface and send a DNS resolution request via that interface. Only in case no response is received some approaches involve sending a request over all (other) interfaces. However, in these cases all responses except the first one are ignored.

All the sent requests are resolved by either the same or different DNS servers 5. They may return the same A (AAAA) resource record, i.e., the same IP address, which is the trivial case (corresponding to the normal, i.e. non hybrid access, HyA, case). However, if the domain that is to be resolved is e.g. belonging to a CDN (Content Delivery Network), different IP addresses may be returned for the different interfaces 4. In this situation, it can be assumed that choosing one of these servers for downloading content is suboptimal for the connection and the traffic engineering in the networks of at least one interface 4.

Thus, the HGW 2 stores or caches all addresses for their corresponding interface in the respective map 6 (as shown in step 4.).

Hence, the illustrated embodiment which, generally, relates to a method for providing to applications distinct IP endpoints per interface 4 for the same content resource and, optionally, routing connections to these distinct endpoints over their according interfaces 4, can be summarized to comprise the steps of: Listening to incoming DNS requests, lookup at local cache, inserting new entries in this cache, Generating corresponding DNS requests for each outgoing interface 4, Caching mappings of domain names to maps 6 of <interface, IP Address>Listening to DNS responses and filling the data structure of 3), Populating local routing tables in accordance with DNS responses, and Providing a map of interfaces to IP in the form of a software interface or DNS extension for applications (HTTP proxy or other multi-downloadable content applications).

Hereinafter, two important aspects of the approach described in connection with the illustrated embodiment that differentiate the proposed solution from prior art approaches, will be described in some more detail: firstly, the provision of this enriched information in the form of an interface to applications that can utilize this information, i.e., applications capable of using multiple sources for retrieving their requested content in parallel (in the following called multi-source capable applications), and secondly, the configuration of forwarding table entries in the HGW 2 that forward packets sent to an IP address having been resolved by the DNS proxy to their according interfaces (using e.g., an iptables configuration).

According to a preferred embodiment, the first aspect can be realized as follows: An application using the enriched DNS information can be located on the HGW 2 itself, i.e., in the form of an application layer proxy such as an HTTP proxy. In this case, the enriched DNS information can be exchanged between the DNS proxy and the application using a proprietary interface. The application proxy then could map (single-source) content requests from an application on the client 1 to multi-source download requests, transparently to the client 1. For this, the application proxy is configured to intercept client 1 requests and look up the (multi-interface) entries of the DNS proxy that match the request. This would be possible for example in the case of plain HTTP. While there are potentially many proxy or client applications that can make use of this feature for multi-source download (HTTP, particularly DASH, SVC streaming, . . . ), as will be easily appreciated by those skilled in the art, the principle is here only shortly explained for HTTP as an exemplary use-case for embodiments of the present invention.

The client application first resolves the domain name under which the content it wants to download is to be found. The steps described above are executed, leading to a) the routing table of the HGW 2 being populated with new entries for the received addresses, and b) the application receiving a normal DNS response with at least one IP address. The application then tries to establish a download connection to one of these server addresses (since it is assumed in this scenario to be not multi-source capable).

The HTTP proxy on the HGW then acts like follows. When the client 1 sends the HTTP GET request via the HGW, the HTTP proxy on the HGW 2 inspects this request and looks up the domain name included in the request in the DNS proxy's cache. If the entry exists, the HGW 2 then translates the content request into a multi-source request, e.g. using HTTP range requests, to distribute the download over the different servers found in the entry. Details of this type of download are out of the scope of the present invention, however, examples can be found in K. Evensen et al.: "Using bandwidth aggregation to improve the performance of quality-adaptive streaming", in Signal Processing: Image Communication, 27(4):312{328, April 2012, or in Pablo Rodriguez and Ernst W. Biersack: "Dynamic parallel access to replicated content in the internet", in IEEE/ACM Trans. Netw., 10(4):455{465, August 2002. It is just necessary for this proxy scenario that the multi-source download is also transparent to the user, i.e., the received content must appear to the client 1 as coming over one connection.

According to an alternative solution the DNS proxy can be configured to provide its enriched information to (multi-source capable) applications implemented on the client 1. This has the advantage of flexibility and of being application-layer protocol-independent (e.g., also supporting HTTPS). For this option, the client application needs to receive a DNS response, indicated in step 5, that includes a selection of resolved IP addresses for different interfaces 4, so that it can then establish connections to this set or a subset of endpoints.

According to a preferred embodiment, the second aspect mentioned above can be realized as follows: the DNS resource records gathered via the different interfaces 4 may be used directly for routing purposes on the HGW 2. A possible way of realizing this is to configure the routing/forwarding table on the HGW 2 by selecting as outgoing port for each IP address in a received resource record the interface 4 over which that resource record was received. Thus, a rule is installed, e.g., via iptables, to forward packets with destination IP address a.b.c.d to interface if$_x$ if a.b.c.d was contained in a DNS response received over if$_x$.

In principle, it is possible that the same destination IP address is returned for DNS queries over different interfaces 4 (for the same client DNS request), e.g., if only one content server exists, or for requests from different applications, if the CDN resolves requests according to more criteria than user access location. In case of such a conflict a collision resolution can resolve the issue. This can be implemented by keeping track of the set rules on the HGW 2, and running a simple heuristic if a collision is detected.

For instance, such a simple example heuristic could be that for IP addresses that were received over more than one interface, the route should be set to use the preferred/default interface if it received one of the duplicates, and randomly/optimized for the HGW 2 otherwise, e.g., by choosing the interface with the highest maximum capacity or the lowest current traffic volume. In any case, connectivity should be unaffected for the client, with the worst case being that a suboptimal interface is selected for a client application.

In addition, these configured forwarding rules should not be permanent, but should expire after some time. According to an embodiment it may be provided that this issue is handled with timeouts, either fixed ones starting from the rule installation time or starting when the rule was applied for the last time, or both (as in OpenFlow).

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for operating a home gateway having multiple interfaces, the method comprising:
   implementing hybrid network access in which each of the multiple interfaces of the home gateway enables a client connected to the home gateway to communicate over a respective one of a plurality of parallel external access networks;
   receiving a single domain name service (DNS) resolution request from the client;
   in response to receiving the single DNS resolution request from the client, resolving, by a DNS proxy function of the home gateway, the single DNS resolution request by requesting, in parallel and transparently to the client, a respective DNS resolution via each of the multiple interfaces;
   receiving, by the DNS proxy function, a respective DNS resolution response via each of the multiple interfaces, wherein each of the DNS resolution responses replies to a respective one of the DNS resolution requests; and
   returning, by the DNS proxy function, one or more of the DNS resolution responses to the client.

2. The method according to claim 1, wherein each of the interfaces has a respective internet protocol (IP) address, each of the IP addresses are different, and the DNS proxy function, when generating the multiple DNS resolution requests in response to the single DNS resolution request received from the client, uses the IP address of the interface corresponding to the respective DNS resolution request as a source IP address.

3. The method according to claim 1, wherein the home gateway compares DNS resolution requests received from the client to a local cache of requests.

4. The method according to claim 3, wherein the home gateway, in case there is no entry for a domain name of a DNS resolution request, creates a new entry mapping the respective domain name to a map that contains the interfaces of the home gateway together with associated entries for the resolved IP addresses of the domain names.

5. The method according to claim 1, wherein each of the DNS resolution responses include a respective internet protocol (IP) address and the method further comprises: generating enriched DNS information including a response list that indexes each of the DNS resolution responses according to the respective interface that received the DNS resolution response.

6. The method according to claim 5, wherein the enriched DNS information is exchanged between the DNS proxy and an application proxy located on the home gateway via a proprietary interface.

7. The method according to claim 5, further comprising:
converting a single-source content requests received from the client to a multi-source content request based on the enriched DNS information.

8. The method according to claim 5, wherein the DNS proxy provides the enriched DNS information directly to a multi-source capable application on the client.

9. The method according to claim 1, wherein an interface between the DNS proxy and a multi-source capable application on the client is provided in form of an extension to the DNS protocol that introduces resource records (RR), that separate lists of source IP addresses according to the interfaces on which the respective DNS resolution responses were received.

10. The method according to claim 1, wherein DNS resource records gathered via different interfaces are employed for routing purposes on the home gateway.

11. The method according to claim 10, wherein the routing and/or forwarding tables on the home gateway are configured by selecting as outgoing port for each IP address in a received resource record an interface over which the resource record was received.

12. The method of claim 1, wherein each of the parallel access networks is a different species of telecommunications infrastructure extending between the home gateway and the internet.

13. The method of claim 1, further comprising:
receiving, from the client, a subsequent request, the subsequent request identifying a single domain name;
mapping, based on a predetermined list, the single domain name to (i) a first network address and (ii) a second network address;
selecting, based on the predetermined list, (i) a first one of the interfaces for reaching the first network address and (ii) a second one of the interfaces for reaching the second network address; and
transmitting, in parallel, information based on the subsequent request to (i) the first network address via the first interface and (ii) the second network address via the second interface.

14. The method of claim 1, wherein returning the one or more DNS resolution responses to the client comprises:
selecting, by the DNS proxy function, a subset of the multiple DNS resolution responses received by the home gateway; and
returning, by the DNS proxy function, the selected subset to the client.

15. A method for operating a home gateway that implements hybrid access with a number of interfaces to different access networks, the method comprising:
resolving, by a domain name service (DNS) proxy function of the home gateway, DNS resolution requests received from a client of the home gateway, and
returning, by the DNS proxy function, corresponding DNS resolution responses to the client,
wherein the DNS proxy function, based on a single DNS resolution request from the client, requests a number of DNS resolutions via different interfaces of the home gateway transparently to the client, and
wherein the DNS proxy generates, from a received set of DNS resolution responses, a single DNS response message to be delivered to the client that follows the standard DNS message format and that has as its content one IP address per interface, the one IP address being selected from the DNS resolution responses received via the respective interface.

16. A device for deployment as a home gateway, comprising:
multiple interfaces, wherein each of the multiple interfaces is configured to enable a client connected to the device to communicate over a respective one of a plurality of parallel external access networks for providing hybrid access capabilities, and
a DNS proxy function configured to:
receive a single domain name service (DNS) resolution request from the client;
in response to receiving the single DNS resolution request from the client, resolve the single DNS resolution requests by requesting, in parallel and transparently to the client, a respective DNS resolution via each of the multiple interfaces;
receive a respective DNS resolution response via each of the multiple interfaces, wherein each of the DNS resolution responses replies to a respective one of the DNS resolution requests; and
return one or more of the DNS resolution responses to the client.

17. The device according to claim 16, comprising a local cache, the local cache comprising, for each of a plurality of domain names, a respective map indexing each of the multiple interfaces with a respective internet protocol (IP) address for accessing the domain name via the interface.

18. The device according to claim 16, comprising an interface for returning cached IP endpoints with interface distinctions from the DNS proxy to an application on the client.

* * * * *